United States Patent [19]

Dimmler et al.

[11] 4,396,695
[45] Aug. 2, 1983

[54] ELECTROPHOTOGRAPHIC MEDIUM WITH HETEROCYCLIC AZO PHOTOCONDUCTOR

[75] Inventors: Manfred Dimmler, Dannstadt-Schauernheim; Gerhard Hoffmann, Otterstadt; Dieter Buhl, Frankenthal, all of Fed. Rep. of Germany

[73] Assignee: BASF Aktiengesellschaft, Fed. Rep. of Germany

[21] Appl. No.: 358,598

[22] Filed: Mar. 16, 1982

[30] Foreign Application Priority Data

Mar. 20, 1981 [DE] Fed. Rep. of Germany ....... 3110957

[51] Int. Cl.³ .................... G03G 5/06; G03G 5/14
[52] U.S. Cl. ........................ 430/59; 430/58; 430/76; 430/77
[58] Field of Search .............. 430/57, 72, 58, 59, 430/76, 77

[56] References Cited

U.S. PATENT DOCUMENTS

| | | | |
|---|---|---|---|
| 3,839,034 | 10/1974 | Wieodendek | 430/58 |
| 3,973,959 | 8/1976 | Rochlitz et al. | 430/58 |
| 4,099,970 | 7/1978 | Okazaki et al. | 260/307 G X |
| 4,251,613 | 2/1981 | Sasaki et al. | 430/72 |

Primary Examiner—Roland E. Martin, Jr.
Attorney, Agent, or Firm—Keil & Witherspoon

[57] ABSTRACT

An electrophotographic recording medium which consists essentially of an electrically conductive base and a photosemiconductive double layer which comprises a first layer containing charge carrier-producing dyes, and a second layer containing one or more compounds which are charge carrier-transporting when exposed to light, wherein the charge carrier-producing dyes are those of the general formula I

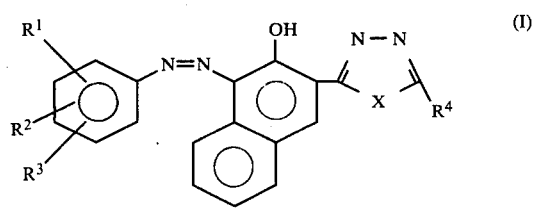

where $R^1$, $R^2$ and $R^3$ are each hydrogen, halogen, alkyl, nitro or cyano, $R^4$ is phenyl, halophenyl, alkylphenyl, nitrophenyl or dialkylaminophenyl, and X is oxygen, sulfur, NH or N-phenyl, and the production of this recording medium.

4 Claims, No Drawings

ELECTROPHOTOGRAPHIC MEDIUM WITH HETEROCYCLIC AZO PHOTOCONDUCTOR

The present invention relates to an electrophotographic recording medium which consists of an electrically conductive base and a photosemiconductive double layer composed of organic materials, and to a process for the production of this electrophotographic recording medium.

Electrophotographic recording media comprise either one homogeneous layer of a photosemiconductor, or a plurality of layers one on top of another, on an electrically conductive base. Recording media with this multi-layer composite structure comprise a conductive base, a first layer containing charge carrier-producing compounds, and, on top of this layer, a second layer containing charge-carrier transporting substances. Composite structures of this type have been described, inter alia, in German Laid-Open Application DOS No. 2,220,408, and a number of compounds have also been disclosed which are suitable charge carrier-producing substances for use in electrophotographic recording media of this type. These compounds include, inter alia, symmetrical disazo dyes containing an oxadiazole ring as the central unit (Japanese Preliminary Published Applications Nos. 2,129/1979 and 12,742/1979). Other symmetrical oxadiazole derivatives are known to be charge carrier-transporting compounds (German Laid-Open Application DOS No. 2,715,714).

It is an object of the present invention to provide a very photosensitive electrophotographic recording medium which contains organic photosemiconductors and which can be produced from a dye dispersion in a very simple manner, the electrophotographic element being flexible, resilient and resistant to abrasion.

We have found that this object is achieved with an electrophotographic recording medium which comprises (a) an electrically conductive base, (b) a first layer, from 0.005 to 5 μm thick, which contains charge carrier-producing dyes of a particular type, and (c) a second layer which is substantially transparent to actinic light and is composed of insulating organic materials containing one or more compounds which are charge carrier-transporting when exposed to light.

Adhesive and barrier layers may be incorporated between the individual layers (a), (b) and (c), if required.

Accordingly, the present invention relates to dyes which are effective, in the first layer of the electrophotographic recording medium, as charge carrier-producing components.

It is surprising that a layer containing a dye of the general formula I

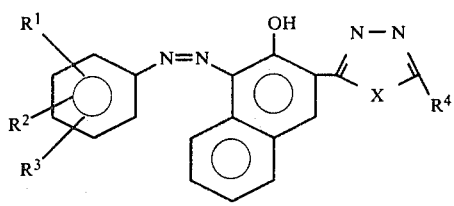

where $R^1$, $R^2$ and $R^3$ are each hydrogen, halogen, alkyl, nitro or cyano, $R^4$ is phenyl, halophenyl, alkylphenyl, nitrophenyl or dialkylaminophenyl, and X is oxygen, sulfur, NH or N-phenyl, is suitable as a high-hiding, charge carrier-producing layer for use in electrophotographic recording media.

Preferred compounds are those of the formula II

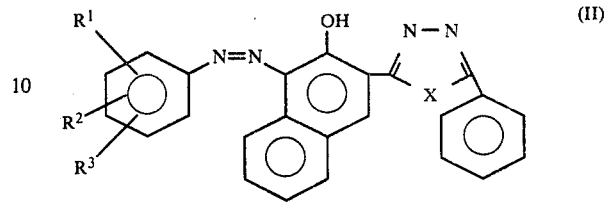

where $R^1$, $R^2$ and $R^3$ are each hydrogen, halogen, $C_1$-$C_4$-alkyl, nitro or cyano, and X is oxygen, sulfur or N-phenyl.

These compounds can be obtained by reacting a β-hydroxynaphthoic acid ester with hydrazine hydrate in a suitable solvent, eg. methyl glycol, to give β-hydroxynaphthoic acid hydrazide. The hydrazide is acylated or benzoylated with an unsubstituted or substituted acid chloride, and the product is reacted with $P_2O_5$ or $P_2S_5$, in N-methylpyrrolidone as the solvent, to give the corresponding 2,5-disubstituted oxadiazole or thiadiazole, which is employed as a coupling component in the synthesis of the dye.

To prepare the novel electrophotographic recording medium, the first charge carrier-producing layer is applied, as a dispersion, to the electrically conductive base. The dispersion used for the first layer is prepared by tumbling about 20–85 percent by weight, based on the solids content of the dispersion, of one or more of the dyes which are suitable according to the invention with 80–15 percent by weight of a binder which is conventionally used for this purpose and which may or may not possess the characteristics of a barrier layer, in the form of a solution in a highly volatile organic solvent.

The first layer is cast so that a dry layer about 0.005–5 μm, preferably 0.05–1.4 μm, thick results. An adhesive layer about 0.05–5 μm, preferably 0.1–0.8 μm, thick may be located between the base and the first layer.

The transparent second layer, preferably 2–40 μm thick, is located on top of the first layer, and is also cast from a solution. It is composed of from 30 to 60 percent by weight of one or more charge carrier-transporting compounds, from 65 to 35 percent by weight of one or more binders conventionally used for this purpose, and from 0.1 to 4 percent by weight of additives which improve the mechanical properties, with or without up to 5 percent by weight of sensitizers or activators. The layer is cast from a low-boiling solvent.

A barrier layer about 0.05 to 1.5 μm, preferably 0.1 to 0.5 μm, thick may be located between the first and second layers, and, depending on the intended use of the electrophotographic recording medium, it may be appropriate to apply an inactive, protective top layer to the charge carrier-transporting layer.

Suitable electrically conductive bases are aluminum foils, aluminum sheet or nickel sheet, or plastic films, preferably polyester films, coated by vapor deposition with aluminum, tin, lead, bismuth or a similar metal. The choice is influenced by the field of use of the electrophotographic element.

The barrier layer between the conductive base and the first layer, or between the latter and the second layer, usually consists of a metal oxide, eg. aluminum oxide, or a polymer, eg. a polyamide, polyvinyl alcohol, a polyacrylate or polystyrene, or a similar system. However, the binder of the first layer may also be used as the barrier layer material, if desired.

Polyacrylates, polymethacrylates, polyesters, polyphthalates, polyvinyl chlorides, styrene/maleic acid copolymers, epoxides and other conventional resins are suitable binders for accomodating the dyes according to the invention in the production of the charge carrier-producing layer which forms part of the novel electrophotographic recording medium.

Suitable binders for the second, charge carrier-transporting layer are in particular polyvinyl chloride, polyester resins, polyacetal resins, polycarbonates, polystyrene and polyurethanes, ie. those binders which are known by the skilled worker to possess special electrical properties. Thus, silicone resins, polyvinyl acetate, chlorinated rubber, cellulose esters, ethylcellulose and the like may also be used. Suitable charge carrier-transporting compounds present in this layer are those which do not adversely affect the transparency to visible light, for example (a) low molecular weight compounds, in particular heterocyclic compounds, eg. pyrazoline derivatives, oxazoles, oxadiazoles, phenylhydrazones, imidazoles, triphenylamine derivatives, carbazole derivatives and pyrene derivatives, and other, condensed aromatic compounds, and (b) polymeric materials, for example polyvinylpyrenes, poly-(N-vinylcarbazole) and copolymers of carbazole and styrene and/or vinyl acetate and/or vinyl chloride.

Of the polymers, poly-(N-vinylcarbazole) is particularly suitable.

The novel electrophotographic recording media may also contain further constituents to improve their mechanical properties. Thus, wetting agents, for example silicone oils, can improve the surface quality. Moreover, sensitizers or activators may additionally be incorporated into the upper, second layer. Examples of conventional sensitizers, which may be dispersed, are triphenylmethane dyes, xanthone dyes and soluble perylene derivatives, e.g. perylenetetracarboxylic acid esters. Compound having a high electron affinity, for example nitro compounds, such as 2,4,7-trinitrofluoren-9-one, may be used as activators.

The novel electrophotographic recording medium contains very photosensitive photosemiconductive double layers which possess high mechanical stability and can run continuously, for example attached to the surface of a cylindrical drum or as an endless belt, without exhibiting signs of wear. Accordingly, they are very useful for reproduction work, for example as copying layers or electrophotographic offset printing plates.

The Examples which follow illustrate the invention.

EXAMPLES 1 TO 7

5 g of each of the dyes 1 to 7 were mixed with 3 g of a copolymer of vinyl chloride, acrylic acid and a maleic acid diester, and 25 g of tetrahydrofuran, and the mixture was tumbled on a roller-stand for 12 hours. The mixture was homogenized on the roller-stand for one hour.

This dispersion was then applied with a knife-coater to a base of 175 μm thick untreated aluminum sheet. A 60 μm casting slot was used, and the speed of the knife-coater was 260 mm/minute. After the solvent had been allowed to evaporate off in the air and drying had been effected for 30 minutes at 90° C., a 0.75-0.8 μm thick dry layer resulted.

A solution of 47.75 g of poly-(N-vinylcarbazole), 5.2 g of dihexyl phthalate and 5.75 g of a polycarbonate of melting point 220°-230° C. in a mixture of 287.5 g of tetrahydrofuran and 74.25 g of toluene was applied to the first, high-hiding layer in each case. A casting slot of 140 μm was used, and the speed of the knife-coater was 260 mm/minute. After the solvent had been allowed to evaporate off in the air and drying had been effected for 30 minutes at 90° C., an 8-8.5 μm thick dry layer was obtained.

The electrophotographic element prepared in this manner was subjected to such a high voltage with a corona wire at a distance of 10 mm above the surface of the layer, that all electrophotographic recording media reached an equally high negative surface potential. After 20 seconds in the dark, the electrophotographic element was exposed for one second to light from a 150 watt xenon lamp, and the light-induced decrease in potential, as a percentage of the potential after it had decreased in the dark, was determined. Furthermore, the rate of the light-induced decrease in potential was determined in volts per second.

The results of the measurements are summarized in Table 1.

TABLE 1

| Example (compound) | Light-induced decrease in potential in % | Rate of decrease in the potential on exposure to light, in volts per second |
| --- | --- | --- |
| 1 | 51.3 | 1740 |
| 2 | 67.8 | 2770 |
| 3 | 60.0 | 1940 |
| 4 | 56.3 | 1715 |
| 5 | 68.0 | 1885 |
| 6 | 75.8 | 3645 |
| 7 | 85.2 | 3875 |

EXAMPLES 8 TO 14

Electrophotographic recording media comprising a first layer similar to that of Examples 1 to 7 and a second, charge-transporting layer consisting of 45 parts by weight of 2,5-bis-(4-diethylaminophenyl)-1,3,4-oxadiazole, 55 parts by weight of a polycarbonate of the above class and 1.1 parts by weight of a silicone oil were produced by the process described.

The results of the measurements are summarized in Table 2.

TABLE 2

| Example | Compound | Light-induced decrease in potential in % | Rate of decrease in the potential on exposure to light, in volts per second |
| --- | --- | --- | --- |
| 8 | 1 | 53.0 | 840 |
| 9 | 2 | 86.8 | 3880 |
| 10 | 3 | 89.8 | 3475 |
| 11 | 4 | 83.7 | 4200 |
| 12 | 5 | 89.4 | 5625 |
| 13 | 6 | 82.1 | 2595 |
| 14 | 7 | 73.6 | 3470 |

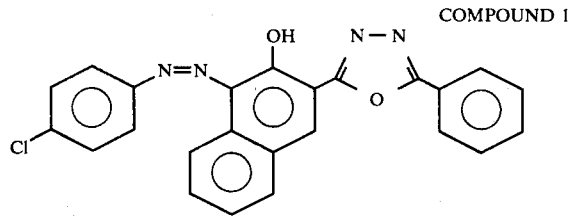

COMPOUND 1

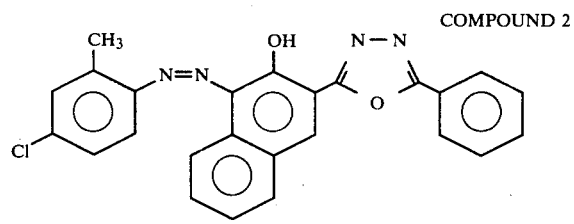

COMPOUND 2

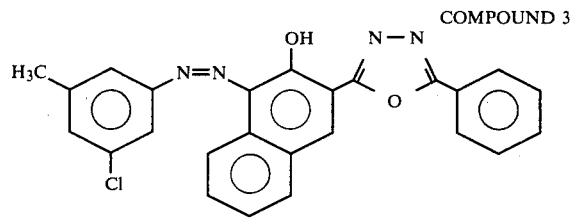

COMPOUND 3

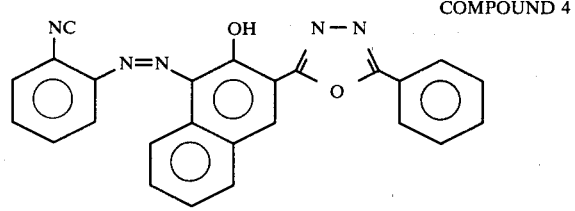

COMPOUND 4

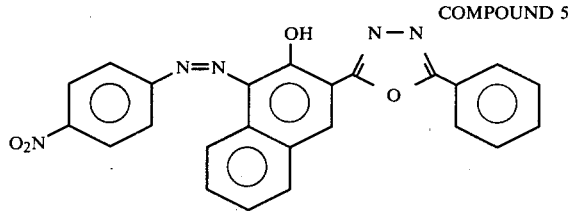

COMPOUND 5

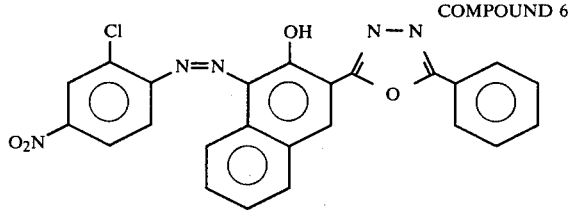

COMPOUND 6

-continued

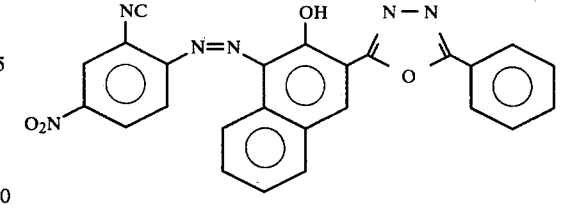

COMPOUND 7

We claim:

1. An electrophotographic recording medium which consists essentially of an electrically conductive base, a first layer containing charge carrier-producing dyes, and a second layer which is substantially transparent to actinic light and is composed of an insulating organic material containing at least one compound which is charge carrier-transporting when exposed to light, wherein the charge carrier-producing dye is of the formula I

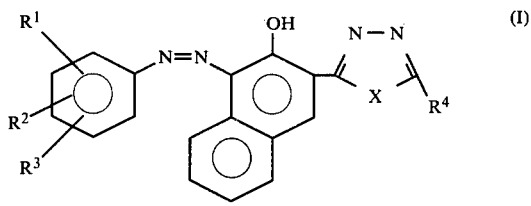

(I)

where $R^1$, $R^2$ and $R^3$ are each hydrogen, halogen, alkyl, nitro or cyano, $R^4$ is phenyl, halophenyl, alkylphenyl, nitrophenyl or dialkylaminophenyl, and X is oxygen, sulfur, NH or N-phenyl.

2. An electrophotographic recording medium as claimed in claim 1, wherein the charge carrier-producing dye is of the formula II

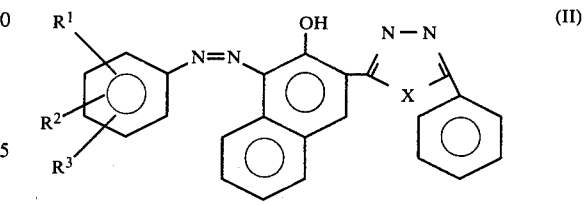

(II)

where $R^1$, $R^2$ and $R^3$ are each hydrogen, halogen, $C_1$–$C_4$-alkyl, nitro or cyano, and X is oxygen, sulfur or N-phenyl.

3. An electrophotographic recording medium as claimed in claim 1, wherein in the second layer, which is substantially transparent to actinic light, the compound which is charge carrier-transporting when exposed to light is poly-(N-vinylcarbazole).

4. An electrophotographic recording medium as claimed in claim 1, wherein in the second layer, which is substantially transparent to actinic light, the compound which is charge carrier-transporting when exposed to light is 2,5-bis-(4-diethylaminophenyl)-1,3,4-oxadiazole.

* * * * *